June 2, 1970  S. R. SCOTT ET AL  3,515,065

DRAFTING TOOL

Filed Aug. 9, 1968

INVENTORS.
SIDNEY R. SCOTT & GLEN W. LIGHT

BY *William E. Kramer*

ATTORNEY

United States Patent Office 3,515,065
Patented June 2, 1970

1

3,515,065
DRAFTING TOOL
Sidney R. Scott, 2730 N. 11th, and Glen W. Light, 3890 Ernestine Drive, both of Beaumont, Tex. 77703
Continuation-in-part of application Ser. No. 694,781, Dec. 26, 1967. This application Aug. 9, 1968, Ser. No. 756,719
Int. Cl. B41l 47/02
U.S. Cl. 101—368                                    3 Claims

ABSTRACT OF THE DISCLOSURE

This invention includes an improved drafting tool or instrument for rapid reproduction of hash lines and/or intricate detail or the like on an engineering or architectural drawing. A white or light colored plastic card or board is provided with dark or black colored relief on one surface corresponding to the lines or detail sought to be produced. When the card is placed under a sheet of drafting paper which is preferably thin and translucent, the dark relief will be visible to the draftsman whereby the card may be positioned so that the relief corresponds to other lines on the paper. A soft pencil or crayon may then be rubbed over the paper to produce the detail on the paper.

Related cases

Figure 1:
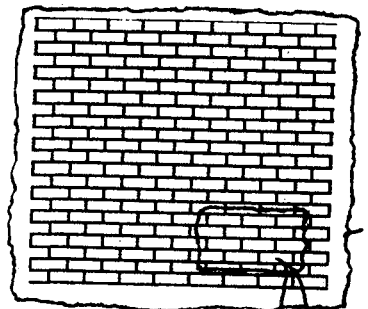

This is a continuation-in-part of a copending patent application Ser. No. 694,781 filed Dec. 26, 1967, since abandoned by Sidney R. Scott and Glen W. Light.

Background of invention

This invention relates to apparatus for making engineering and architectural drawings and the like, and more particularly relates to improved apparatus for providing cross hatching and other special detail in selected portions of such drawings.

It is well known that technical drawing is a time consuming hand operation. Although there are now many reproduction techniques available for quickly producing a a large number of substantially identical copies, within a relatively short time and at a relatively low cost, the original drawing is still produced in substantially the same manner as that used a century ago. It is true that many improved drafting instruments and tools have been developed, such as lettering guides and pens, transparent plastic rules and squares, and so-called "drafting machines," these improved tools and instruments have generally been intended to permit the work to be done better, rather than faster. Accordingly, it will readily be apparent that the primary cost of producing a blue print or diazo print, or the like, is still the cost of the draftsman.

There have been many attempts to reduce the amount of labor which is required to produce an engineering or architectural drawing. However, few of these attempts have met with any permanent acceptance, and drafting is still largely a hand operation, especially when it is necessary to depict extensive detail.

In one attempt to reduce the amount of labor required to insert cross hatching and other standardized intricate detail, it was proposed to insert an embossed card or the like under the drawing, whereby the upper side of the drawing could be rubbed with a soft pencil or crayon to burnish in the cross hatching or detail sought to be inserted in the drawing. For example, see a discussion of the basic concept of this burnishing technique in U.S. Pats. No. 830,282; No. 1,129,573; and No. 1,187,881, wherein cards or plates having a raised surface are proposed for the purpose of burnishing in structural details such as brick and stone walls, windows including frames, sills and sashes, and cross hatching of all types. Although the fundamental concept of burnishing such detail into the drawing is clearly valid, there were a number of difficulties attending the use of the cards or plates illustrated in the aforementioned patents, and the like, and thus the burnishing technique has never been generally accepted until now.

These difficulties of the prior art cards and similar devices have now been overcome, however, and improved drafting apparatus is provided for adding cross hatching and other standardized detail or symbolism to engineering and architectural drawings and the like.

Preferred embodiment of invention

As hereinbefore stated, the present invention includes a card or plate having a raised relief on one side which corresponds to the detail sought to be inserted on the drawing. In its broader general concept, such a card is intended to provide means for burnishing on the detail in the manner described in the aforementioned patents, and thus the detail is produced by rubbing the upper surface of the paper immediately above the card with a soft "lead" pencil or crayon.

Although the present invention is generally related to cards or plates as described by the prior art patents, the cards or plates particularly contemplated by the present invention preferably include features not suggested or described by the prior art. In particular, it is highly desirable that the relief pattern of the card be clearly visible through the drawing paper or tracing cloth overlying it, since the areal extent and shape of the portion of the drawing to be detailed will usually be only a small irregular portion of the areal surface of the card underneath. Thus, it is a significant advantage that the base or field portion of the upper surface of the card be white, or at least very light colored, and that the raised surfaces of the relief pattern be black or at least a very dark contrasting color.

If the relief is dark or black, the relief design or pattern will usually be clearly visible through all types of reasonably translucent paper or tracing cloth. Thus, the draftsman can conveniently shift the card under the tracing cloth or drawing paper to position cross hatching lines and other detail more appropriately and attractively within the lines which define the component or part surface being illustrated.

This is particularly important for two principal reasons. In the first place, it is particularly desirable, especially in small areas of the drawing where there are a number of closely spaced lines, that the lines of any cross hatching be rather carefully positioned relative to other lines so that none of the hatching lines appear to represent edges or corners of any of the illustrated components. Thus, it is essential that the relief pattern of the card be clearly visible through or under the paper or tracing cloth so that the relief pattern can be located very precisely with respect to the other lines on the drawing, before the cross hatching is burnished onto the paper or cloth.

In those cases where the relief pattern is designed to illustrate architectural detail such as windows and doors, it is obviously essential that the relief pattern be clearly visible under the paper so that the windows and doors can be located properly. Even in those instances where the relief pattern is intended to represent brick or stonework or the like, it is extremely desirable that the relief pattern be located so as to depict the detail in a pleasing manner, since the saleability of the architect's concept is usually directly related to the professional and artistic appearance of the drawings.

Another important feature of the preferred form of the subject cards, especially with respect to larger cards used to provide large area detail, is that the relief be substantially uniform in height or thickness. This is important because it is extremely preferable that the lines of the hatching or other detail be reproduced uniformly onto the paper with respect to shading and weight.

Accordingly, it is extremely desirable that the cards not only have relief which is substantially of a uniform height above the base portion of the card, but that the base of the card also be of a substantially uniform thickness and that the card be flat. Cards of this character and quality may, of course, be fashioned by many techniques, and from many different materials. It has been determined, however, that high quality cards are preferably molded, and preferably using a high impact thermoplastic such as polystyrene or the like, with the plastic material being pre-colored to provide a base or background of a white or other very light color. The upper edges of the relief may be conveniently darkened by the use of black paint after the molding operation.

It is quite important that the card have a base thickness sufficient to give the card strength, and also sufficient to maintain a flat configuration. On the other hand, it is also quite important that the card be thin enough whereby it may be conveniently inserted under a pinned or taped-down drawing paper or cloth, without disturbing the pins or tape, and without stretching or tearing the paper or cloth. Accordingly, it is particularly desirable for purposes of the present invention that a card have a base thickness of at least $3/32$ of an inch and not greater than $3/16$ of an inch. Although the card may be formed with any suitable shape, it is preferable that the card be generally rectangular, and that the corners be rounded to avoid engaging and puncturing the overlying paper or cloth.

It is further important that the relief pattern not be overly pronounced in thickness, although it is equally important that the relief be sufficiently high so that the draftsman will not press the paper against the field or base portion of the card during burnishing, and so that the detail of the relief pattern may be easily and clearly reproduced. Accordingly, it has been determined that the relief portion of the cards be at least $1/100$ of an inch thick, and not greater than $2/100$ of an inch thick, in order to achieve the purposes of the present invention.

SUMMARY

An object of the invention is to provide raised images as drawing burnishing aids on the top surfaces of plates of varying sizes and shapes to provide raised lines, surfaces and borders in detail of said images which may be quickly transferred and reproduced upon the top surfaces of a sheet of drawing paper by a marking means used as a burnishing tool by rubbing or rolling said marking means over the top surface of said drawing paper and thereby burnishing lines, surfaces and borders onto the top surface of said drawing paper defining the linear picture of said image.

Another object of the invention is to provide raised images as drawing burnishing aids on the top surface of plates of varying sizes and shapes to provide raised surfaces in detail of said images spaced apart and arranged so that any selected one may be utilized in transferring and reproducing a particular image to the top surface of a sheet of drawing paper or the like by means of a marking means used as a burnishing tool such as a leaded pencil or the like.

A further object of the invention is to provide raised images as drawing burnishing aids arranged and spaced apart on the top surface of plates and being of varying sizes and shaped to provide raised lines, surfaces and borders in detail on the top surfaces of said plates and raised of sufficient height so that the top edges of the lines, surfaces and borders outlining every detail of the images on said plate and separated from each other by sufficient open space that the top exposed raised edges of the lines, surfaces and borders when transferring and reproducing linear lines, surfaces and borders of same upon the top surface of a sheet of drawing paper by a marking means used as a burnishing tool when rubbed or rolled across the top surface of the drawing paper stretched over the top of said raised image that well defined and sharp linear lines, surfaces and borders will be transferred and reproduced on the top surface of the drawing paper defining said image at the place desired.

A still further object of the invention is to provide raised images as drawing burnishing aids of the character described having raised lines, surfaces and borders above the top surfaces of said plate so that the drawing paper whether translucent or transparent may be easily and quickly positioned and stretched over said image desired with or without the aid of light in the table beneath said plate for correctly positioning an image selected beneath a sheet of drawing paper at the desired place when the selected image and the lines, surfaces and borders thereof may be transferred and reproduced onto the top linear surface of said drawing sheet of paper by rubbing or rolling a marking means used as a burnishing tool over the top surface of the paper to transfer and reproduce the linear lines, surfaces and borders of a selected image onto the top surface of said sheet of drawing paper at the place desired.

A still further object of the invention is to provide raised images upon the top surfaces of a plate of the character described whereby said plates and images are made of translucent or transparent material preferably a high impact moldable thermoplastic, which may be easily and cheaply molded with raised lines, surfaces and borders upon the top surface of the plates and adapted to be used with or without light from a table beneath the plates and images but are more perfectly adapted for use with a light from the table beneath the plate and raised image on the top surface thereof so that the light will shine through the plate and image for quickly and accurately positioning the plate and selected image thereon beneath the desired place on the drawing paper where same is to be linearly transferred and reproduced on the top surface of said drawing paper by shifting the drawing paper or the plate with raised image on the top surface thereof to the position where desired to be transferred or reproduced linearly on the top surface of said drawing paper, and, doing so by the marking means used as a burnishing tool rubbed or rolled across the top surface of the drawing paper above the raised image selected to transfer and reproduce the linear lines, surfaces and borders of the image onto the top surface of the drawing paper.

A still further object of the invention is the technique whereby an image raised upon the top surface of a plate thus providing a burnishing aid with lines, surfaces and borders defining said image may be utilized in transferring and reproducing said image linearly onto the top surface of a sheet of drawing paper by the steps of locating said image beneath a sheet of paper at the desired position for transfer, stretching the sheet of paper over the top of the raised image on the plate, rubbing or rolling the top surface of the sheet of paper with a marking means used as a burnishing tool to cause linear lines, surfaces and borders from the raised image therebeneath to be transferred and reproduced upon the top linear surface of the sheet of paper.

A still further object of the invention is the method whereby an image raised upon the top surface of a plate providing a drawing burnishing aid with raised lines, surfaces and borders of an image to be transferred and reproduced at the desired place on the top surface of a sheet of drawing paper by the steps of superimposing a sheet of paper over the raised image at the desired position of transfer, pressing the sheet of paper over the top of the raised lines, surfaces and borders of the raised image, rubbing or rolling the pressed top surface of the sheet of paper with a marking means used as a burnishing tool by opposed strokes striking the top raised edges of the lines, surfaces and borders of the raised portions of the plate to transfer and reproduce linearly the lines, surfaces and borders from the raised lines, surfaces and borders of the image raised upon the plate onto the linear surface of the sheet of paper by burnishing the linear lines, surfaces and borders of the image on the top surface of the sheet.

Drawing

These and other objects of the invention will in part be obvious and will in part be more fully disclosed in the specification, the drawings of which show one plate embodying examples of images of objects used in architectural drawings of houses, buildings and the like, but it is understood that these images of objects are used only as examples and that any image of a graphic writing, emblem, symbol or design of any object used in any kind of drawing or for any purpose may be used and be transferred and reproduced by the techniques herein disclosed where such objects are raised images thereof being defined by raised lines, surfaces or borders or the like on the top surface of a plate and such plate with any such object depicted thereon is utilized for the purpose of reproducing or transferring linear lines, surfaces or borders or the like in the manner set forth herein, or within the range of equivalents to which this invention is entitled.

Figure 2:
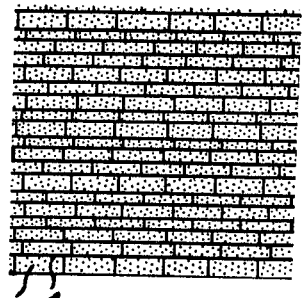
Figure 3:
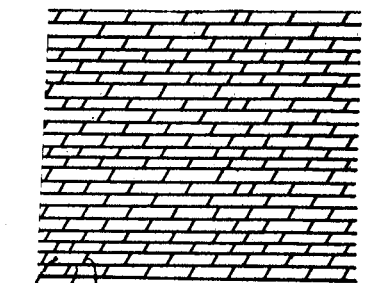
Figure 4A:
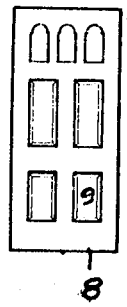
Figure 4B:
Figure 4C:
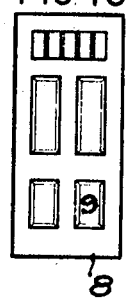
Figure 4D:
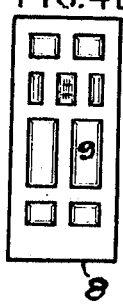
Figure 5:
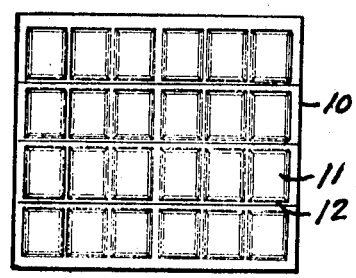
Figure 6A:
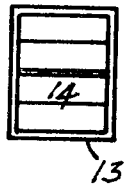
Figure 6B:
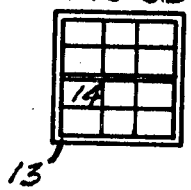
Figure 6C:
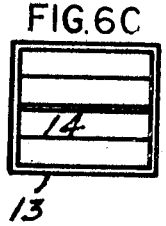
Figures 7A, 7B, 7C:
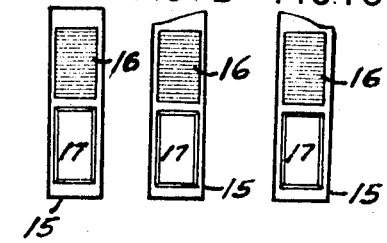
Figures 8A, 8B:
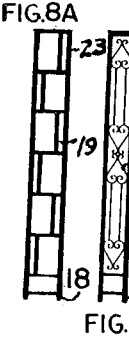
Figures 8C, 8D:
Figures 8E, 8F:
Figures 8G, 8H:
Figure 8I:
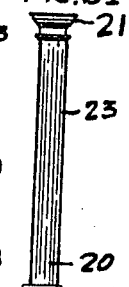
Figures 9A, 9B, 9C:
Figure 10:
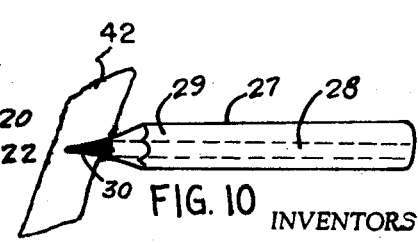
Figure 11:
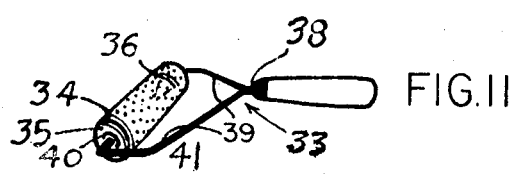

FIG. 1 is a vertical side view, partly sectional, showing the broken out section as raised bricks and mortar in a wall with the lines and the borders of the bricks and mortar therebetween transferred and reproduced linearly on a sheet of paper in fragmentary view superimposed and overlapping said brick wall section raised in relief on the top surface of a plate illustrating how said drawing burnishing aid is constructed and arranged on the top surface of the plate and the result of the method of transferring and reproducing linear lines, suraces and borders when the marking means used as a burnishing aid is utilized by the method herein disclosed to transfer and reproduce the linear lines, surfaces and borders onto the top surface of the sheet of drawing from the lines, surfaces and borders raised in relief on top surface of the plate positioned beneath the sheet of paper;

FIG. 2 is a vertical side view showing thick and thin bricks in a wall forming a combination with layers of mortar therebetween raised on a plate with the raised lines, surfaces and borders defining the image of a brick wall of such construction and arrangement as a drawing burnishing aid;

FIG. 3 is a vertical side view showing thick and thin bricks or permastone or the like forming a combination with layers of mortar therebetween and with the ends of the bricks beveled but parallel to each other and to the bricks, and with the lines or edges representing the mortar being raised on a plate in the manner of lines, surfaces and borders defining a brick wall of such construction and arrangement as a drawing burnishing aid;

FIGS. 4A–D provide a vertical side view showing a portion of the image in relief representing four types of doors with panels therein of varying designs which may be used as a drawing burnishing aid;

FIG. 5 is a vertical side view showing a portion of an image in relief representing translucent squares of glass blocks or the like with cement mortar therebetween which may be used as a drawing burnishing aid;

FIGS. 6A–C provide a vertical side view showing a portion of the image in relief representing three types of glass panels of varying design which may be used as a drawing burnishing aid;

FIGS. 7A–C provide a vertical side view showing a portion of the image in relief representing three types of parallel shutters of varying design which may be used as a drawing burnishing aid;

FIGS. 8A–I provide a vertical side view showing a portion of the image in relief representing nine types of columns of varying designs which may be used as a drawing burnishing aid;

FIGS. 9A–C provide a vertical side view showing a portion of the image in relief representing three types of louvers of varying design which may be used as a drawing burnishing aid;

FIG. 10 is a vertical side view of a pencil with large lead therein and representing a marking means used as a burnishing tool; and FIG. 11 is a vertical side view of a roller marking means used as a burnishing tool for transferring and reproducing linear lines, surfaces and borders and the like from raised lines, surfaces and borders and the like from a drawing burnishing aid to the top surface of a sheet of drawing paper stretched over said raised image of an object.

The invention will be better understood from a more detailed description thereof, reference being had to the accompanying drawings wherein like numeraled parts herein denote like numeraled parts therein in the various views of the drawings.

DETAILED DESCRIPTION

Referring now to the drawings, there may be seen a pictorial representation of a plurality of exemplary patterns of lines and the like which may be provided on a card 32 preferably formed of a high impact thermoplastic as hereinbefore explained, and having one or more images formed of lines and/or surfaces raised in relief on the upper surface thereof. Referring more particularly to FIG. 1, there may be seen a relief pattern representing a brick wall or the like, wherein the bricks are depicted by raised lines 2 located above the surface 1 of the card 32 which, in turn, is positioned on the table or drawing board (not specifically depicted) below a sheet of tracing cloth or preferably translucent drawing paper 31.

Referring now to FIG. 2, there may be seen a different relief pattern for depicting a wall of bricks of varying thickness. In particular, raised lines 4 are provided to represent the outlines of the bricks and the mortar joints therebetween, and raised dots 3 are also provided to support the paper 31 above the base or field surface 1 of the card or plate 32. In addition, burnishing over the dots 3 will depict the rough exterior surfaces of the bricks and more realistically illustrate a wall constructed in this manner.

Referring now to FIG. 3, there may be seen another different image wherein bricks 5 are illustrated having varying thicknesses with each horizontal layer of bricks 5 having angled ends 6 in matching parallel design with mortar lines 7 forming a wall section therebetween. In FIG. 4, the numeral 8 denotes doors (four in number) with varying sized and shaped panels 9 with the outline of said panels and the borders of said doors being provided in relief on a plate 32 as hereinbefore described, and as shown in FIG. 4 of the drawing. In FIG. 5 the numeral 10 denotes a section of a wall comprised of square glass blocks 11 with mortar 12 therebetween, and with the outline of said blocks 11 and mortar 12 and borders of said section of said wall being provided in relief on plate 32 as hereinbefore explained. In FIG. 6, the numeral 13 denotes windows (three in number) with varying sized and shaped panels of glass 14 with the outline of said panels and borders of said windows being provided in relief on plate 32. In FIG. 7, the numeral 15 denotes shutters (three in number) with louvers 16 and panels 17 and borders of said shutters being provided in relief on plate 32.

Referring now to FIG. 8, there may be seen a representation of columns (nine in number), the first eight of which reading from left to right are of ornamental iron design 18 and the ninth being square column 20 with square crown 21 and rounded base 22. The inner braces 19 of the eight columns of ornamental iron design and the borders 23 of all of the columns are provided in relief on plate 32. The numeral 24 denotes louvers (three in number) with panels 25 and the borders 26 being provided in relief on plate 32 as shown in FIG. 9 of the drawings.

Referring now to FIG. 10, there may be seen a pictorial view of a pencil 27 used as a burnishing tool and having a large central core or lead 28 running lengthwise thereof and encased in wooden case 29. As may further be seen, a portion of the lead core end 30 preferably protrudes beyond the wooden case 29, whereby the exposed lead core end 30 may be utilized in rubbing over the top surface of the drawing paper 42 superimposed or stretched over the plate 32. The linear lines, surfaces and borders from the pattern of the raised image are thereby transferred and reproduced onto the top surface of said sheet of paper 42. It is to be understood that plate 32 may include any one or all of the various relief images represented by FIGS. 1-9, and that FIG. 11 represents a roller burnishing tool which may be conveniently used as burnishing aid instead of the pencil depicted in FIG. 10.

A roller burnishing aid 33 such as shown in FIG. 11 of the drawing may have an outer felt covering 34 surrounding hollow perforated cylinder 35 filled with powdered graphite 36 or any known marking material. The cylinder 35 may be attached to shank 38 which is furcated at its lower end and terminating in two opposed spindles 39—39 perpendicular to said shank 38 and inserted through central holes 40—40 in the hubs 41—41 closing each end of the perforated hollow cylinder 35. The upper end of said shank 38 terminates in a formed handle providing means for manually rolling the cylinder 35 and felt cover 34 over the paper 31 so as to burnish the various lines, surfaces and borders of the pattern onto selected areas of the tracing cloth or translucent paper.

What is claimed is:

1. Apparatus for applying to a selected portion of a sheet of drafting paper and the like a preselected pattern of additional marks in a functionally related and located manner with respect to other marks previously applied thereon, said apparatus comprising
   a plate member molded as a single unit from a high impact moldable thermoplastic material and adapted to be inserted snugly below and adjacent said paper and selectively opposite said other previously applied marks thereon,
   said plate member having a substantially flat base portion of substantially uniform thickness of at least $3/32$ of an inch and not greater than $3/16$ of an inch said base portion is substantially invisible relative and of a light color whereby said upper surface of to said other previously applied marks on said paper, and
   a raised relief portion of substantially uniform thickness greater than $1/100$ of an inch and not greater than $2/100$ of an inch on said upper surface of said base portion having a configuration corresponding to said preselected pattern of additional marks and further being of a dark color whereby said relief pattern is visible through said paper relative to said previously applied marks thereon,
   said raised relief portion being formed during the molding of said plate member, 2. The plate member described in claim 1, wherein said plate member is molded as a single unit from polystyrene and the upper edges of said relief portion are painted a substantially black color, and
   wherein said base portion of said plate member is formed with a generally rectangular configuration and with generally rounded corners.

3. The plate member described in claim 2, wherein said base portion thereof is substantially white in color and opaque.

References Cited

UNITED STATES PATENTS

| | | | |
|---|---|---|---|
| 830,282 | 9/1906 | Andrews | 101—368 |
| 1,129,573 | 2/1915 | Johnson. | |
| 1,187,881 | 6/1916 | Armstrong | 101—368 |
| 1,470,066 | 10/1923 | Dumars. | |
| 2,558,877 | 7/1951 | Ress. | |
| 2,645,178 | 7/1953 | Brainard et al. | 101—369 |
| 2,806,299 | 9/1957 | Dubas. | |
| 2,996,822 | 8/1961 | Souza. | |
| 3,034,430 | 5/1962 | Bradford | 101—369 |

FOREIGN PATENTS 665,176   9/1936   Germany.

ROBERT E. PULFREY, Primary Examiner

E. H. EICKHOLT, Assistant Examiner

U.S. Cl. X.R.

101—372, 375

UNITED STATES PATENT OFFICE
CERTIFICATE OF CORRECTION

Patent No. 3,515,065    Dated June 2, 1970

Inventor(s) Sidney R. Scott and Glen W. Light

It is certified that error appears in the above-identified patent and that said Letters Patent are hereby corrected as shown below:

Col. 8, line 3 should read --and of a light color whereby said upper surface of--Col. 8, line 4 should read --said base portion is substantially invisible relative--

SIGNED AND SEALED
JAN 5 1971

(SEAL)
Attest:

Edward M. Fletcher, Jr.
Attesting Officer

WILLIAM E. SCHUYLER, JR.
Commissioner of Patents